(No Model.)
W. P. BETTENDORF.
HARROW.
No. 458,820. Patented Sept. 1, 1891.
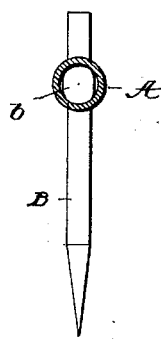
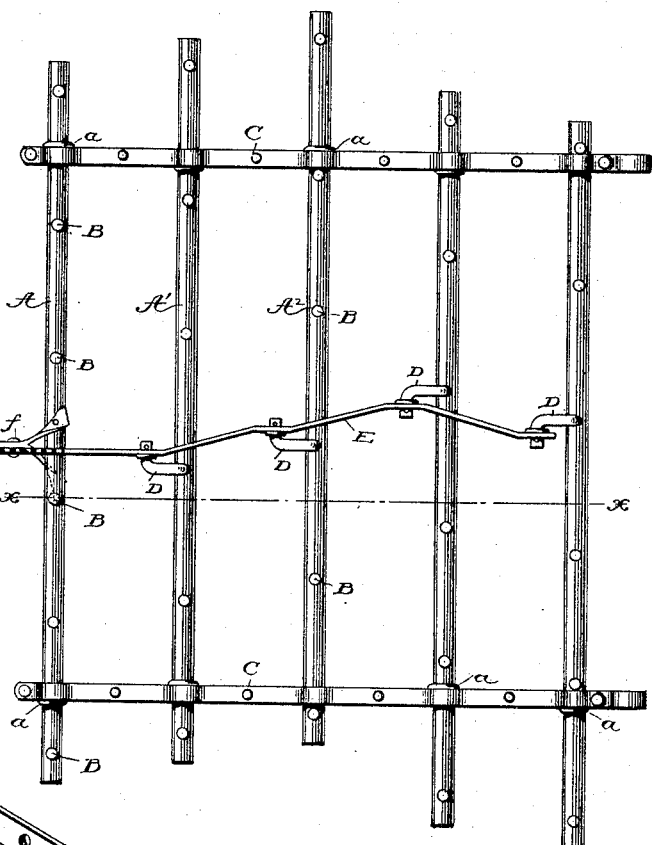
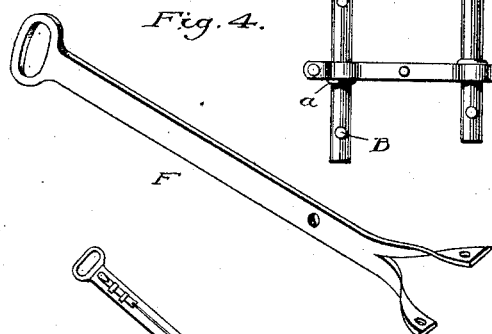
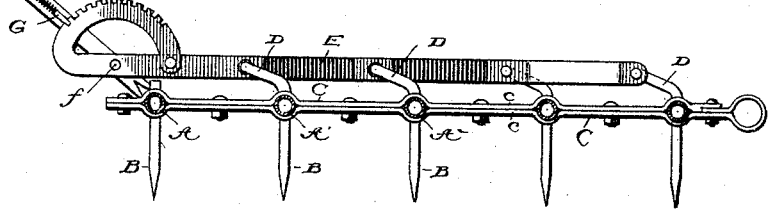
Witnesses
Inventor
W. P. Bettendorf
By Phil. T. Dodge
Attorney

UNITED STATES PATENT OFFICE.

WILLIAM P. BETTENDORF, OF DAVENPORT, IOWA.

HARROW.

SPECIFICATION forming part of Letters Patent No. 458,820, dated September 1, 1891.

Application filed October 3, 1890. Serial No. 366,930. (No model.)

*To all whom it may concern:*

Be it known that I, WILLIAM P. BETTENDORF, of Davenport, in the county of Scott and State of Iowa, have invented certain Improvements in Harrows, of which the following is a specification.

My invention relates to toothed metallic harrows, its object being to produce a harrow which will be strong and light, and the manufacture of which will be attended with little expense.

The invention is applicable to harrows in which the tooth-sustaining bars are rigid, and to that class of harrows embodying pivoted tooth-bars.

The invention consists in combining with a tubular perforated bar a tooth inserted in the perforation and enlarged within the bar in order to prevent end motion of the tooth.

In the accompanying drawings, Figure 1 is a top plan view of a harrow with my invention embodied therein. Fig. 2 is a sectional elevation of the same on the line $xx$ of Fig. 1. Fig. 3 is an enlarged view showing the tooth containing an enlargement or shoulder within the tubular bar. Fig. 4 is a perspective view of the operating-lever detached.

Referring to the drawings, A A', &c., represent metal tooth-supporting bars of tubular form in cross-section. These bars are perforated at suitable intervals for the reception of teeth B. Each tooth is secured to the bar by forming an enlargement $b$ on the tooth within the bar. This enlargement is formed by the operation known as "upsetting," which consists in compressing the tooth endwise until the portion within the bar bulges out and forms an annular shoulder or enlargement, as plainly shown in Fig. 3. It will be observed that the enlargement $b$ nearly fills the interior of the bar, forming in effect shoulders both at the upper and lower sides of its interior, so that under this construction endwise movement of the tooth is practically impossible. Further, there exists practically no liability of the tooth loosening within the bar.

Each of the tooth-bars A is mounted to turn within frame-bars C, consisting, as shown, of straps $c$, bolted together at intervals and bent to surround the tooth-bars. Adjacent to the frame-bars the tooth-bars are provided with annular shoulders $a$ to prevent their endwise movement with relation to the frame-bars.

In order that the tooth-bars may be rocked when desired, I form certain of the teeth, preferably those extending in a line longitudinally of the harrow, with upwardly-extending arms D, which are bent laterally at their ends. Upon these laterally-bent ends I mount a connecting-bar E, which is extended at its end upward and bent backward on itself where its end is bolted. The bent portion of the bar is toothed on its upper edge, and forms a quadrant for use in connection with an operating-lever F. This operating-lever consists of a flat metal plate, and is pivoted at $f$ to the connecting-bar E. Its lower end is split, forming two legs, which are bolted to opposite sides of one of the tooth-bars. The lever is provided with a spring-latch G, of the ordinary construction, which is designed to engage the teeth on the quadrant and hold the parts in the positions to which they may be adjusted.

While I have illustrated my invention with reference to the enlargement of the tooth within the tooth-bar applied to a harrow provided with pivoted tooth-bars, it is to be understood that its application is not confined to this class of harrows, but that it is equally appropriate in connection with harrows in which the tooth-bars are rigid.

Having thus described my invention, what I claim is—

1. In a harrow, a tubular perforated bar, in combination with a metal tooth inserted therethrough and enlarged within the bar.

2. In a harrow, a tubular perforated bar, in combination with a metal tooth inserted therethrough and enlarged to form in effect shoulders within the bar at opposite sides.

In testimony whereof I hereunto set my hand, this 12th day of September, 1890, in the presence of two attesting witnesses.

WILLIAM P. BETTENDORF.

Witnesses:
GUSTAV N. MEVES,
THOS. B. CARSON.